United States Patent
Grufman et al.

(10) Patent No.: US 12,153,435 B2
(45) Date of Patent: Nov. 26, 2024

(54) ROBOTIC WORK TOOL SYSTEM AND METHOD FOR DEFINING A WORKING AREA

(71) Applicant: HUSQVARNA AB, Huskvarna (SE)

(72) Inventors: Stefan Grufman, Bankeryd (SE); Björn Mannefred, Jönköping (SE); Fredrik Kallström, Huskvarna (SE); Patrik Jägenstedt, Tenhult (SE); Jonas Agerhall, Taberg (SE); Kent Askenmalm, Huskvarna (SE); Göran Calás, Forserum (SE)

(73) Assignee: HUSQVARNA AB, Huskvarna (SE)

( * ) Notice: Subject to any disclaimer, the term of this patent is extended or adjusted under 35 U.S.C. 154(b) by 958 days.

(21) Appl. No.: 17/057,381

(22) PCT Filed: Jun. 4, 2019

(86) PCT No.: PCT/EP2019/064481
§ 371 (c)(1),
(2) Date: Nov. 20, 2020

(87) PCT Pub. No.: WO2019/234020
PCT Pub. Date: Dec. 12, 2019

(65) Prior Publication Data
US 2021/0200228 A1     Jul. 1, 2021

(30) Foreign Application Priority Data
Jun. 7, 2018    (SE) .................................... 1850686-5

(51) Int. Cl.
*G05D 1/00*     (2024.01)
*A01D 34/00*    (2006.01)
(Continued)

(52) U.S. Cl.
CPC ......... *G05D 1/0219* (2013.01); *A01D 34/008* (2013.01); *G05B 19/42* (2013.01);
(Continued)

(58) Field of Classification Search
CPC .. G05D 1/0219; G05D 1/0227; G05D 1/0246; G05D 1/0274; G05D 2201/0208;
(Continued)

(56) References Cited

U.S. PATENT DOCUMENTS 4,600,999 A   7/1986   Ito et al.
6,112,143 A   8/2000   Allen et al.
(Continued)

FOREIGN PATENT DOCUMENTS

WO   2016057185 A1   4/2016
WO   2017167207 A1   10/2017

OTHER PUBLICATIONS

International Search Report and Written Opinion for International Application No. PCT/EP2019/064481 mailed Sep. 5, 2019.
(Continued)

*Primary Examiner* — Anne Marie Antonucci
*Assistant Examiner* — Lidia Kwiatkowska
(74) *Attorney, Agent, or Firm* — Burr & Forman LLP (57) ABSTRACT

A robotic work tool system (200) for defining a working area (205) in which a robotic work tool (100) is subsequently intended to operate. The robotic work tool system (200) comprises a robotic work tool (100), at least one controller (210) and at least one memory (220). The robotic work tool (100) comprises at least one sensor unit (170) configured to collect sensed input data while the robotic work tool (100) is driven around the working area (205) to preliminarily define a perimeter around the working area (205). The at least one controller (210) is configured to establish a preliminary working area perimeter (250). The at least one
(Continued)

memory (220) is configured to store a perimeter adjustment function and instructions that cause the at least one controller (210) to adjust the perimeter of the working area (205) by applying the stored perimeter adjustment function to the established preliminary working area perimeter (250) and thereby produce an adjusted working area perimeter (260). The perimeter adjustment function is based on the collected sensed input data corresponding to terrain features.

15 Claims, 6 Drawing Sheets

(51) Int. Cl.
    *A01D 69/02*     (2006.01)
    *G05B 19/42*     (2006.01)
    *A01D 101/00*     (2006.01)

(52) U.S. Cl.
    CPC ......... *G05D 1/0227* (2013.01); *G05D 1/0246* (2013.01); *G05D 1/0274* (2013.01); *A01D 69/02* (2013.01); *A01D 2101/00* (2013.01)

(58) Field of Classification Search
    CPC .... G05D 1/0265; A01D 34/008; A01D 69/02; A01D 2101/00; G05B 19/42; G05B 2219/36464; Y10S 901/01
    See application file for complete search history.

(56) References Cited

U.S. PATENT DOCUMENTS

| | | | | |
|---|---|---|---|---|
| 9,516,806 | B2* | 12/2016 | Yamauchi | G05D 1/0221 |
| 9,740,210 | B2* | 8/2017 | Sjöholm | B60L 50/52 |
| 9,949,431 | B2* | 4/2018 | Willgert | A01D 34/008 |
| 10,444,760 | B2* | 10/2019 | Grufman | G05D 1/0234 |
| 10,598,793 | B2* | 3/2020 | Öhrlund | G05D 1/0219 |
| 2014/0081568 | A1* | 3/2014 | Pieper | A01B 79/005 |
| | | | | 701/400 |
| 2017/0150676 | A1 | 6/2017 | Yamauchi et al. | |
| 2017/0364090 | A1* | 12/2017 | Grufman | G05D 1/0274 |
| 2018/0059682 | A1* | 3/2018 | Thode | B60W 40/105 |

OTHER PUBLICATIONS

Swedish Office Action and Search Report for Swedish Application No. 1850686-5, Mailed on Feb. 6, 2019.

* cited by examiner

ROBOTIC WORK TOOL SYSTEM AND METHOD FOR DEFINING A WORKING AREA

TECHNICAL FIELD

This disclosure relates to a robotic work tool system as well as a method for defining a working area in which a robotic work tool is subsequently intended to operate.

BACKGROUND

A robotic work tool is an autonomous robot apparatus that is used to perform certain tasks, for example for cutting lawn grass. A robotic work tool may be assigned an area, hereinafter referred to as a working area, in which the robotic work tool is intended to operate. This working area may be defined by the perimeter enclosing the working area. This perimeter may include the borders, or boundaries, which the robotic work tool is not intended to cross.

There exist different ways of setting these boundaries for the robotic work tool. Traditionally, the boundaries, or the perimeter, for the working area have been set manually by a user or operator. The user manually sets up a boundary wire around the area, or lawn, which defines the area to be mowed. A control signal may then be transmitted through the boundary wire. The control signal may preferably comprise a number of periodic current pulses. As is known in the art, the current pulses will typically generate a magnetic field, which may be sensed by the robotic work tool. The robotic work tool may accordingly use these signals from the wire to determine whether the robotic work tool is close to, or is crossing a boundary wire. As the robotic work tool crosses the boundary wire, the direction of the magnetic field will change. The robotic work tool will be able to determine that the boundary wire has been crossed and take appropriate action to return into the working area. However, these boundary wires are typically very time consuming to put into place, as the user has to perform this procedure manually. Furthermore, there is a risk that the boundary wires may become damaged, which will prevent the robotic work tool from operating properly within the working area.

In view of the above, another way to set the boundaries for a robotic work tool has been proposed, namely a way that does not use physical boundary wires. The robotic work tool may use a satellite navigation device and/or a deduced reckoning navigation sensor to remain within a working area by comparing the successive determined positions of the robotic work tool against a set of geographical coordinates defining the boundary of the working area. This set of boundary defining positions may be stored in a memory, and/or included in a digital (virtual) map of the working area.

The above-described non-physical boundaries for a working area may reduce the risk of broken boundaries. Furthermore, non-physical boundaries may reduce the time necessary for installation and setting the boundaries for the working area. The installation is smooth as the robotic work tool is just driven one lap around the working area in order to establish the set of geographical coordinates defining the boundary of the working area in which the robotic work tool is intended to operate. Accordingly, a quicker and easier installation of the robotic work tool and its working area is proposed.

SUMMARY

The inventors of the various embodiments present invention have realized that there do exist drawbacks with the installation of the above proposed wireless working area perimeter that has not yet been addressed and hence, that there is a need for a solution which allows for an improved way of defining a working area.

Even if non-physical boundaries of a working area may be better in many ways, the installation of the non-physical perimeter will not create a working area as accurately as the working area utilizing a physical boundary wire. A user may not be able to control or steer the robotic work tool accurately enough when driving the lap around the working area to set the boundaries. The user may be operating at a distance and may not properly see exactly where the robotic work tool is travelling. The resulting working area perimeter may accordingly be quite rough and may perhaps not fulfilling the user's requirements.

In view of the above, it is therefore a general object of the aspects and embodiments described throughout this disclosure to provide a solution for producing an improved working area perimeter wherein the first established working area perimeter may be refined.

This general object has been addressed by the appended independent claims. Advantageous embodiments are defined in the appended dependent claims.

According to a first aspect, there is provided a robotic work tool system for defining a working area in which a robotic work tool is subsequently intended to operate.

In one exemplary embodiment, the robotic work tool system comprises a robotic work tool, which comprises at least one sensor unit. The at least one sensor unit is configured to collect sensed input data. The at least one sensor unit is configured to collect the sensed input data while the robotic work tool is driven at least a portion of a lap around the working area to preliminarily define a perimeter around the working area. The robotic work tool system further comprises at least one controller. The at least one controller is configured to establish a preliminary working area perimeter. The robotic work tool system further comprises at least one memory. The at least one memory is configured to store a perimeter adjustment function and further includes instructions that, when executed by the at least one controller, cause the at least one controller to adjust the perimeter of the working area by applying the stored perimeter adjustment function to the established preliminary working area perimeter. Thereby the robotic work tool system produces an adjusted working area perimeter.

In one embodiment, the perimeter adjustment function is based on the collected sensed input data.

In one embodiment, the collected sensed input data includes sensed input data that represents a shape of the preliminary working area perimeter.

In one embodiment, the robotic work tool system further comprises an apparatus having a user interface. The user interface is configured to receive user input from a user during the user's operation and interaction with the user interface. The received user input is associated with the collected sensed input data and the perimeter adjustment function is further based on the user input associated with the collected sensed input data.

In one embodiment the robotic work tool system's at least one memory includes instructions that, when executed by the at least one controller, cause the at least one controller to detect, based on the shape of the established preliminary working area perimeter, whether one or more irregularities exist in the preliminary working area perimeter. In response to detecting one or more irregularities in the preliminary working area perimeter, the at least one controller is caused to compensate the preliminary working area perimeter from the detected one or more irregularities by applying the stored perimeter adjustment function to the established preliminary working area perimeter. Thereby the adjusted working area perimeter is produced. For example, the at least one or more irregularities may be detected when a value associated with at least a portion of the preliminary working area perimeter exceeds a smoothness threshold value representing a smooth working area perimeter. The preliminary working area perimeter is compensated from the detected one or more irregularities by smoothing out the one or more irregularities detected in the preliminary working area perimeter.

In one embodiment, the at least one memory of the robotic work tool system further includes instructions that, when executed by the at least one controller, cause the at least one controller to detect one or more edges in the working area. The one or more edges correspond to terrain feature edges. The at least one controller is further caused to align the preliminary working area perimeter in parallel with the one or more edges by applying the stored perimeter adjustment function to the established preliminary working area perimeter. Thereby the adjusted working area perimeter is produced. For example, the collected sensed input data may comprise imaging data and the at least one controller may be caused to detect the one or more edges based on the imaging data. In another example, the collected sensed input data may comprise load exerted on the robotic work tool's cutting blade. The one or more edges in the working area may be detected when the exerted load is below a load threshold value associated with a load exerted on a robotic work tool's cutting blade.

In one embodiment, the robotic work tool is a robotic lawn mower.

According to a second aspect, there is provided a method implemented by the robotic work tool system according to the first aspect.

In one exemplary implementation, the method is performed by a robotic work tool system for defining a perimeter for a working area in which a robotic work tool is subsequently intended to operate. The robotic work tool system comprises at least one controller, at least one memory storing a perimeter adjustment function, and the robotic work tool. The robotic work tool comprises at least one sensor unit. The method comprises collecting sensed input data, by means of the at least one sensor unit, while the robotic work tool is driven at least a portion of a lap around the working area to preliminarily define a perimeter around the working area. The method further comprises establishing, by means of the at least one controller, a preliminary working area perimeter, and adjusting, by means of the at least one controller, the preliminary working area perimeter by applying the perimeter adjustment function to the established preliminary working area perimeter and thereby producing an adjusted working area perimeter.

In one embodiment, the perimeter adjustment function is based on the collected sensed input data. The collected sensed input data may for example include sensed input data that represents a shape of the preliminary working area perimeter.

In one embodiment, the robotic work tool system further comprises an apparatus having a user interface. The method further comprises receiving user input, by means of the user interface. The user input is received from a user during the user's operation and interaction with the user interface. The received user input is associated with the collected sensed input data and the perimeter adjustment function is further based on the user input associated with the collected sensed input data.

In one embodiment, the method further comprises detecting, by means of the at least one controller, based on the shape of the preliminary working area perimeter, whether one or more irregularities in the preliminary working area perimeter exist. In response to detecting one or more irregularities in the preliminary working area perimeter, the method further comprises compensating, by means of the at least one controller, the preliminary working area perimeter from the detected one or more irregularities by applying the perimeter adjustment function to the established preliminary working area perimeter. Thereby the adjusted working area perimeter is produced.

In one embodiment, the method comprises detecting the one or more irregularities in the preliminary working area perimeter by detecting when a value associated with at least a portion of the preliminary working area perimeter exceeds a smoothness threshold value representing a smooth working area perimeter. The method further comprises compensating the preliminary working area perimeter from the detected one or more irregularities by smoothing out the detected one or more irregularities in the preliminary working area perimeter.

In one embodiment, the method further comprises detecting, by means of the at least one controller, one or more edges in the working area. The one or more edges correspond to terrain feature edges. The method further comprises aligning, by means of the at least one controller, the preliminary working area perimeter in parallel with the one or more edges by applying the perimeter adjustment function to the established preliminary working area perimeter and thereby producing the adjusted working area perimeter.

For example, the collected sensed input data may comprise imaging data and the method may comprise detecting the one or more edges based on the imaging data. Additionally or alternatively, the collected sensed input data may comprise load exerted on the robotic work tool's cutting blade and the method may comprise detecting when the exerted load is below a load threshold value associated with a load exerted on a robotic work tool's cutting blade.

Some of the above embodiments eliminate or at least reduce the problems discussed above. A robotic work tool system and method are thus provided which may refine the perimeter around a working area in which a robotic work tool is intended to subsequently operate. By first establishing a preliminary working area perimeter that may be adjusted, it may be possible to achieve an improved working area. The working area may be easy to define, while still being defined with a high precision.

Furthermore, by also take additional data, such as terrain features, into consideration when adjusting the preliminary working area perimeter, the precision of the working area may be further improved.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

These and other aspects, features and advantages will be apparent and elucidated from the following description of various embodiments, reference being made to the accompanying drawings, in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

In one of its aspects, the disclosure presented herein concerns a robotic work tool system for defining a working area in which a robotic work tool subsequently is intended to operate.

The robotic work tool may be realised in many different ways. While the present disclosure will mainly be described in general terms of an autonomous robot designed for mowing a lawn, it should be understood that the robotic work tool described herein may be implemented into any type of autonomous machine that may perform a desired activity within a desired working area, including without limitation a cleaning robotic work tool, a polishing work tool, repair work tool and/or demolition work tool or the like.

Figure 1:
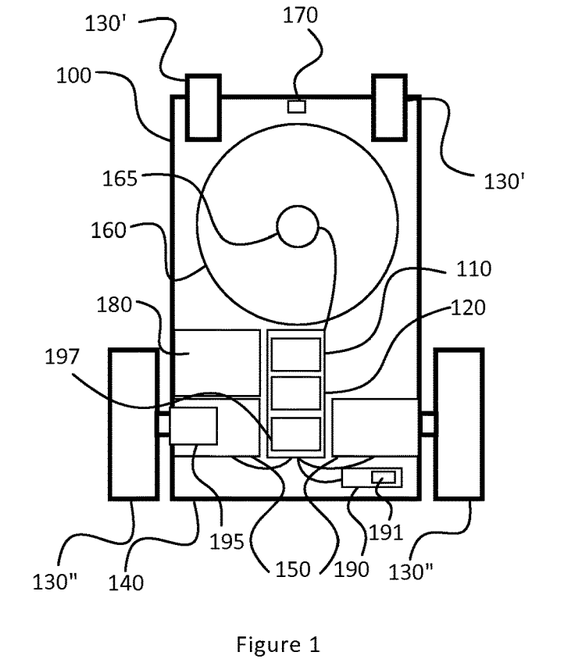
FIG. 1 shows a schematic overview of a robotic work tool.

A schematic overview of one exemplary robotic work tool 100 is illustrated in FIG. 1. FIG. 1 shows a robotic work tool 100 having a body 140 and a plurality of wheels 130. In the exemplary embodiment of FIG. 1, the robotic work tool 100 has four wheels 130, the two front wheels 130' and the two rear wheels 130". At least some of the wheels 130 are drivably connected to at least one electric motor 150. It should be noted that combustion engines may alternatively be used, possibly in combination with an electric motor.

As illustrated in FIG. 1, each of the rear wheels 130" may be connected to a respective electric motor 150. This allows for driving the rear wheels 130" independently of one another which, for example, enables steep turning.

The robotic work tool 100 may also comprise a controller 110. The controller 110 may be implemented using instructions that enable hardware functionality, for example, by using executable computer program instructions in a general-purpose or special-purpose processor that may be stored on a computer readable storage medium (disk, memory etc.) to be executed by such a processor. The controller 110 may be configured to read instructions from the memory 120 and execute these instructions to control the operation of the robotic work tool 100 including, but not being limited to, the propulsion of the robotic work tool 100. The controller 110 may be implemented using any suitable processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic work tool 100 may also comprise a work tool 160, which may include a grass cutting device, such as a rotating blade 160 driven by a cutter motor 165. The cutter motor 165 may be connected to the controller 110, which enables the controller 110 to control the operation of the cutter motor 165.

The robotic work tool 100 may also be arranged with a satellite navigation device 190 which comprises a satellite signal receiver 191. The satellite signal receiver 191 may be a Global Navigation Satellite System (GNSS) satellite signal receiver, such as a Global Positioning System (GPS) satellite signal receiver. The satellite navigation device 190 may be connected to the controller 110 for enabling the controller 110 to determine current positions for the robotic work tool 100 using the satellite navigation device 190 and to control the movements of the robotic work tool 100 based on the determined positions.

The robotic work tool 100 may further comprise a deduced reckoning navigation sensor 195 for providing signals for deduced reckoning navigation, also referred to as dead reckoning. Examples of such deduced reckoning navigation sensor(s) 195 are odometers and compasses.

The robotic work tool 100 may further be arranged with a wireless communication interface 197 for communicating with other devices, such as a server, a personal computer or smartphone, a charging station, a remote control or any remote device which comprises a wireless communication interface and a controller. Examples of such wireless communication are Bluetooth®, Global System Mobile (GSM) and LTE (Long Term Evolution), 5G New Radio, to name a few.

Figure 2A:
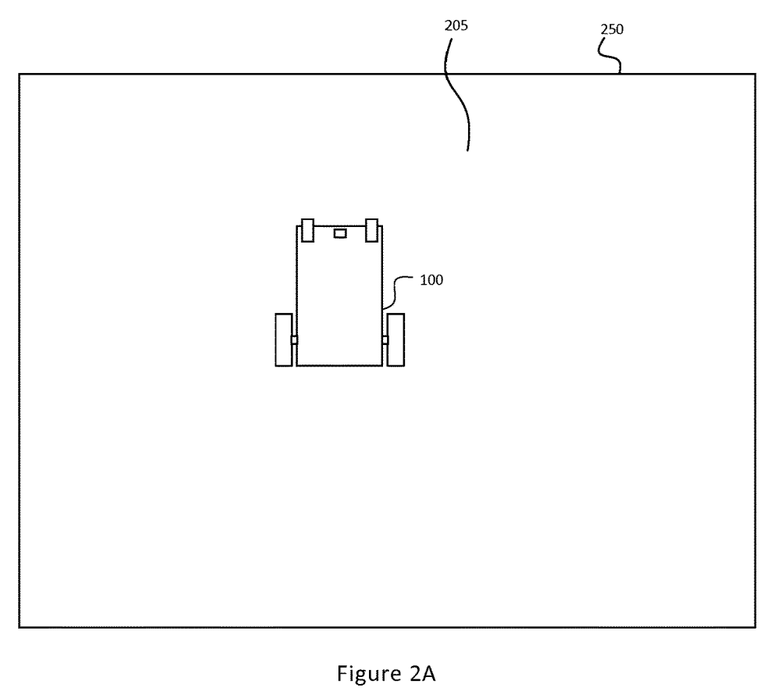
FIG. 2A shows a schematic overview of a robotic work tool in a working area.
Figure 2B:
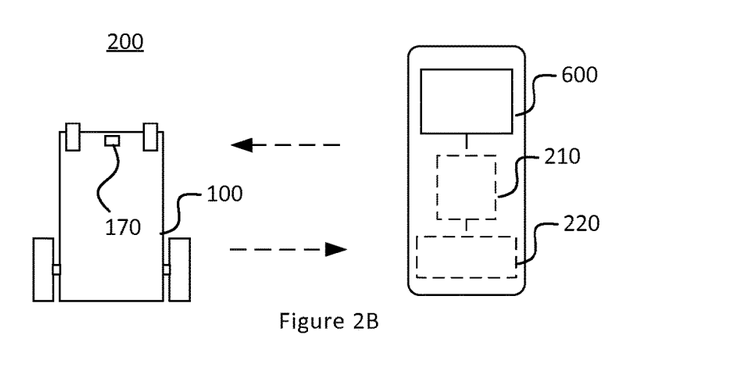
FIG. 2B shows a schematic view of a robotic work tool system according to one embodiment.

With reference to the FIGS. 2A and 2B, a first embodiment according to the first aspect will now be described. FIG. 2A illustrates a schematic overview of a robotic work tool 100 in a working area 205 and FIG. 2B shows a schematic view of a robotic work tool system 200 according to one embodiment. As will be appreciated, the schematic view is not to scale.

FIG. 2A illustrates the working area 205 in which the robotic work tool 100 is intended to operate. Accordingly, if the working area 205 is a lawn, the working area 205 is the area to be mowed by the robotic work tool 100. The perimeter 250 defines the boundaries for the working area 205, and by establishing the perimeter, the robotic work tool 100 will not cross the perimeter and only operate within the enclosed area, i.e. the working area 205.

As illustrated in FIG. 2B, the robotic work tool system 200 used for defining the working area 205 may comprise a robotic work tool 100, at least one controller 210 and at least one memory 220.

The robotic work tool 100 may comprise at least one sensor unit 170. The at least one sensor unit 170 may be configured to collect sensed input data. The at least one sensor unit 170 may be configured to collect the sensed input data while the robotic work tool 100 is driven at least a portion of a lap around the working area 205. The robotic work tool 100 may be driven by an operator (not illustrated) who manually steers the robotic work tool 100 using e.g. a remote control. A remote control may, by way of example, be implemented as a software application in a mobile phone. The robotic work tool 100 may be driven at least a portion of a lap around the working area 205 in order to preliminarily define a perimeter around the working area 205. Preferably, the robotic work tool 100 may be driven a complete lap or substantially a complete lap in order to preliminarily define a perimeter around the working area 205.

The collected sensed input data may be obtained, by the at least one sensor 170, by for example sensing local terrain features and the collected sensed input data may for example be, without limitations, photo data, odometric data, load data, position data etc.

Figure 2C:
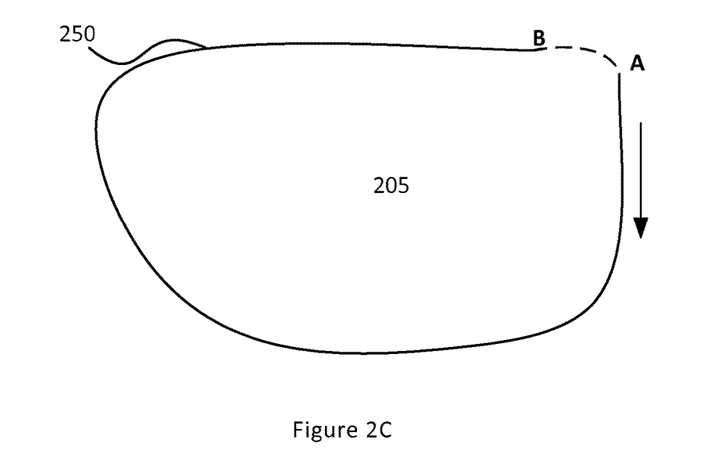
FIG. 2C shows an exemplary preliminary working area perimeter.

FIG. 2C illustrates said at least a portion of a lap around the working area 205. The robotic work tool 100 is driven from point A to point B in order to preliminary define the perimeter around the working area 205. As can be seen in FIG. 2C, the robotic work tool 100 is not necessarily driven a complete lap around the working area, but enough to define the working area. This is described in more detail later.

The robotic work tool system 200 may further comprise at least one controller 210. In one embodiment, the at least one controller 210 may be embodied as a hardware controller. The controller 210 may be implemented using any suitable, publicly available processor or Programmable Logic Circuit (PLC). For example, the at least one controller 210 may be the controller 110 located in the robotic work tool 100. According to another example, the at least one controller 210 may be located in a device that is separate from the robotic work tool 100, e.g. in a device locally present adjacent to the working area and communicatively coupled to the robotic work tool 100. In another embodiment, the at least one controller 210 is embodied as software, e.g. remotely in a cloud-based solution.

Figure 3:
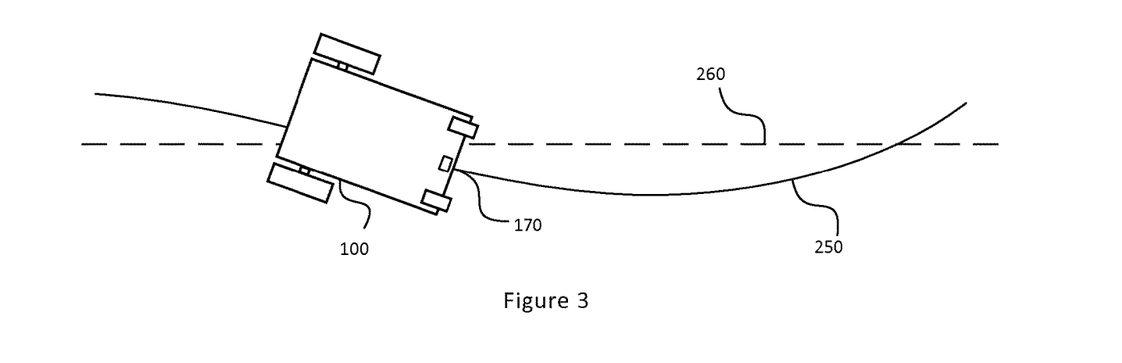
FIG. 3 shows a schematic view of a robotic working tool in operation.

The at least one controller 210 may be configured to establish a preliminary working area perimeter 250. As also illustrated in FIG. 3, the preliminary working area perimeter 250 is the perimeter that is defined when the robotic work tool is driven the said at least a portion of a lap around the working area 205, and may correspond to the path followed by the robotic work tool 100. The path may be recorded by recording positions of the robotic work tool 100 as detected by the satellite navigation device 190 and/or the deduced reckoning navigation sensor 195. For the purpose, the robotic work tool system 200 may further comprise at least one memory 220. The at least one memory 220 may be implemented using any commonly known technology for computer-readable memories such as ROM, RAM, SRAM, DRAM, FLASH, DDR, SDRAM or some other memory technology. The at least one memory 220 may for example be located in the robotic work tool 100 or in a device that is separate from the robotic work tool, e.g. in a device communicatively coupled to the robotic work tool 100. The at least one memory 220 may be configured to store a perimeter adjustment function and may further include instructions that, when executed by the at least one controller 210, cause the at least one controller 210 to adjust the perimeter of the working area. The perimeter of the working area 205 may be adjusted by applying the stored perimeter adjustment function to the established preliminary working area perimeter 250. Thereby an adjusted working area perimeter 260 may be produced. The perimeter adjustment function and the instructions may for example be stored in the same memory 220, alternatively the perimeter adjustment function may be stored in a memory 220 and the instructions may be stored in another memory 220, i.e. separate and distinct from the first memory 220 storing the perimeter adjustment function.

By introducing the above proposed robotic work tool system 200, the previously described disadvantages are eliminated or at least reduced. As also illustrated in FIG. 3, the first established preliminary working area perimeter 250 may be quite rough and may define a working area 205 that does not correspond with an intended perimeter of the working area. By applying the stored perimeter adjustment function to the preliminary working area perimeter 250, the perimeter of the working area 205 may be adjusted such that an adjusted working area perimeter 260 may be produced. Thus, the rough installation, i.e. the preliminary working area perimeter 250, may be refined and a perimeter which is more accurate may be produced, i.e. the adjusted working area perimeter 260.

In one embodiment, the perimeter adjustment function may be based on the collected sensed input data. The controller 210 may be configured to process signals received from the at least one sensor 170. As the perimeter adjustment function is based on the collected sensed input data, it may be possible to account for the surroundings and to produce an adjusted working area perimeter 260 that may take into account parameters that the robotic work tool 100 has encountered while driving the at least a portions of a lap around the working area 205. These parameters may correspond to terrain features. Accordingly, the robotic work tool system 200 may consider environmental data and/or position data when the adjusted working area perimeter 260 is to be produced.

In one embodiment, the collected sensed input data may include sensed input data that represents a shape of the preliminary working area perimeter 250. The shape of the preliminary working area perimeter 250 may be received from the at least one sensor 170 and may for example be based on image data, odometric data, positional data etc. The preliminary working area perimeter 250 may take any form, for example, without limitation, mainly rectangular, circular, irregular etc.

In one embodiment, the robotic work tool system 200 may further comprise an apparatus that has a user interface 600, as illustrated in FIG. 2B. The user interface 600 may for example be a touch user interface. The user interface 600 is illustrated in the figure to be in the same apparatus as the at least one controller 210 and the at least one memory 220. However, in one embodiment the user interface 600 may be located in a device separate from the at least one controller 210 and the at least one memory 220. The apparatus provided with a user interface 600 may be separate from the robotic work tool 100. Alternatively, the apparatus may be the robotic work tool 100 and hence, the user interface 600 may be located at the robotic work tool 100.

The user interface 600 may be configured to display the preliminary working area perimeter 250 to a user/operator who is operating the user interface 600. In one embodiment, the preliminary working area perimeter 250 may be displayed in the user interface 600 associated with the collected sensed input data, which for example may be the terrain features detected by the robotic work tool 100. The terrain features may for example be image data collected by the at least one sensor 170. Accordingly, the preliminary working area perimeter 250 may be overlaid with image data collected by the at least one sensor 170.

The user interface 600 may be configured to receive user input from a user during the user's operation and interaction with the user interface 600. The received user input may be associated with the collected sensed input data and the perimeter adjustment function may further be based on the user input associated with the collected sensed input data. Accordingly, the user may manipulate the preliminary working area perimeter 250 by interacting with the user interface 600. This is illustrated in FIG. 4.

Figure 4:
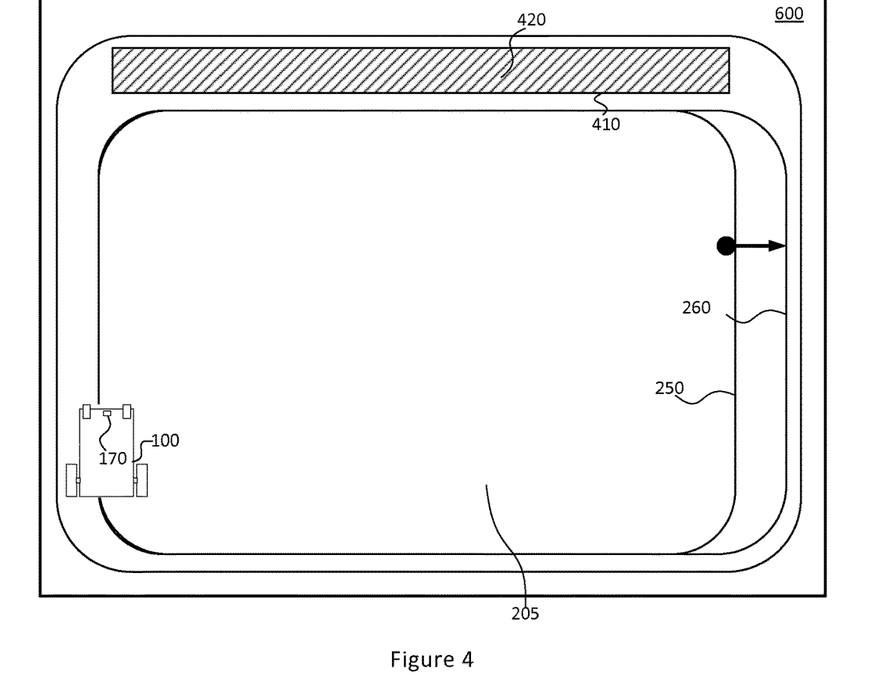
FIG. 4 illustrates a user interface, according to the teachings herein.

FIG. 4 schematically illustrates an example embodiment of a view of the user interface 600. The user interface 600 may display the preliminary working area perimeter 250 that the robotic work tool system 200 has established. The perimeter adjustment function may accordingly be based on user input, illustrated as an arrow in the figure, associated with the collected sensed input data. As the perimeter adjustment function may further be based on the collected sensed input data associated with the user input, it may be possible to improve and refine the adjusted working area perimeter 260 further. It may be possible to, for example, expand the working area 205 to areas that otherwise might have been missed. For example, if the robotic work tool 100 was driven a too small lap around the working area 205 when defining the perimeter around the working area 205, this may be adjusted by touching and dragging the preliminary working area perimeter 250 towards a wanted adjusted working area perimeter 260. Alternatively, if a corner of the preliminary working area perimeter 250 is not satisfactory defined, e.g. too rough, it may be possible to refine the corner. It may furthermore be possible to take parameters only known by the user into account, for example, that a meadow eventually is supposed to be created along a side of the working area etc.

By providing the user interface 600 as described above, a fast and simple adaptation of the preliminary working area perimeter 250 may be achieved. For example, if a large area is missed when driving the robotic work tool 100 around the working area 205 to define the working area perimeter, it is not necessary to re-drive the robotic work tool 100 a new lap around the working area 205 in order to give the perimeter adjustment function a better starting position. The received user input may perform larger adjustments that otherwise only would have been considered by the perimeter adjustment function by re-driving the robotic work tool 100 a new lap around the working area 205.

Figure 5:
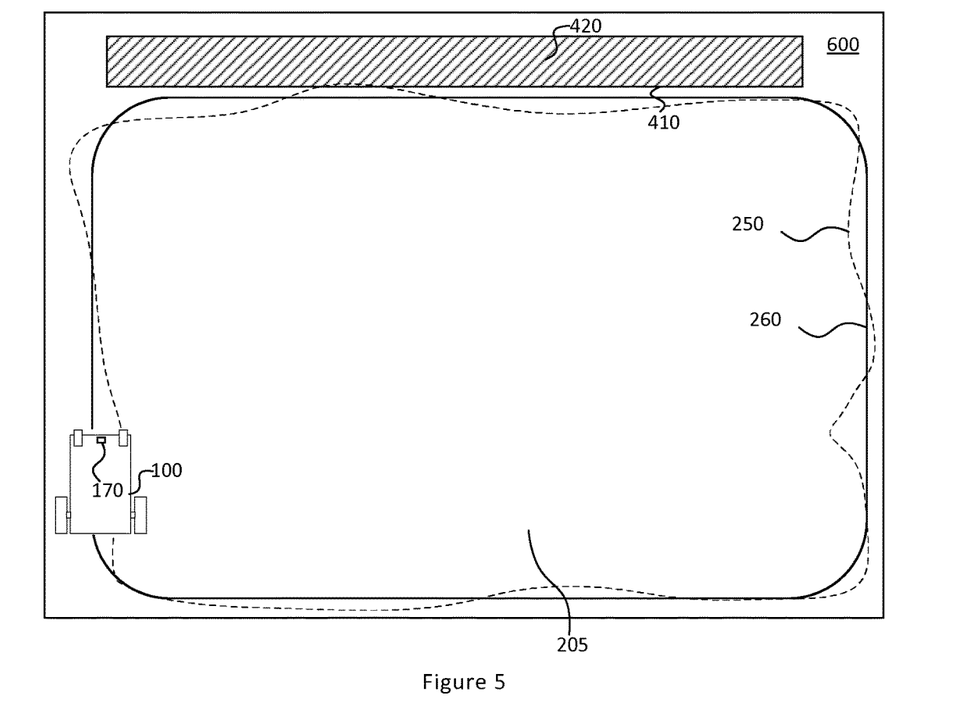
FIG. 5 illustrates a user interface, according to the teachings herein.

In one further embodiment, described with reference to FIG. 5, the robotic work tool system 200 may be configured to, after the adjusted working area perimeter 260 has been produced, drive the robotic work tool 100 one additional lap around the working area 205 guided by the adjusted working area perimeter 260. The user interface may then be configured to display both the preliminary working area perimeter 250 and the adjusted working area perimeter 260. Thereby, it may be ensured that all areas are covered properly by the robotic work tool system 200.

In one embodiment, the at least one memory 220 may include instructions that, when executed by the at least one controller 210, may cause the at least one controller 210 to detect, based on the shape of the established preliminary working area perimeter 250, whether one or more irregularities exist in the preliminary working area perimeter 250. The one or more irregularities may for example exist if the shape of the established preliminary working area perimeter 250 is wavy or undulating due to inaccurate control of the robotic work tool 100 when defining the perimeter around the working area 205.

In response to detecting one or more irregularities in the preliminary working area perimeter 250, the robotic work tool system 200 may compensate the preliminary working area perimeter 250 from the detected one or more irregularities by applying the stored perimeter adjustment function to the established preliminary working area perimeter 250. Thereby the adjusted working area perimeter 260 may be produced.

By compensating the preliminary working area perimeter 250 from the detected one or more irregularities, a rough installation may be refined and the robotic work tool system 200 may thus provide for a more even perimeter around the working area 205. This may ensure that the working area 205 is operated in an even manner and an uneven perimeter may be refined to a straight line, as illustrated in FIG. 3. For example, the robotic work tool system 200 may assume that an almost straight segment of the preliminary working area perimeter 250 should be completely straight, and may be configured to straighten out that segment, either automatically or after prompting the operator. Similarly, the robotic work tool system 200 may assume that an arc shaped segment should have a constant radius of curvature, and may offer to the operator to adjust the perimeter accordingly.

In one further embodiment, the robotic work tool system 200 may detect the at least one or more irregularities when a value associated with at least a portion of the preliminary working area perimeter 250 exceeds a smoothness threshold value representing a smooth working area perimeter. Accordingly, the at least one or more irregularities may be detected when a value indicates that at least a portion of the preliminary working area perimeter does not correspond to a smooth line. A smooth line may be a continuous line without deviations from a uniform path. The preliminary working area perimeter 250 may be compensated from the detected one or more irregularities by smoothing out the one or more irregularities detected in the preliminary working area perimeter 250. Accordingly, with reference to FIG. 3, the value associated with the preliminary working area perimeter 250 may exceed the smoothness threshold as the preliminary working area perimeter 250 does not correspond to a smooth line. The preliminary working area perimeter 250 deviates from the uniform path illustrated as a dashed line in FIG. 3. The detected irregularities may then be smoothed out and an adjusted working area perimeter 260 may be produced.

In one embodiment, described with reference to FIG. 6, the at least one memory 220 of the robotic work tool system 200 may further include instructions that, when executed by the at least one controller 210, may cause the at least one controller 210 to detect one or more edges 410 in the working area 205. The one or more edges 410 may correspond to terrain feature edges. The terrain feature edges may indicate edges of areas that should be excluded from the working area 205. The terrain feature edges may for example be a flower bed, a walk way, a house wall etc.

The robotic work tool system 200 may then align the preliminary working area perimeter 250 in parallel with the detected one or more edges 410 by applying the stored perimeter adjustment function to the established preliminary working area perimeter 250, which will produce the adjusted working area perimeter 260.

Figure 6:
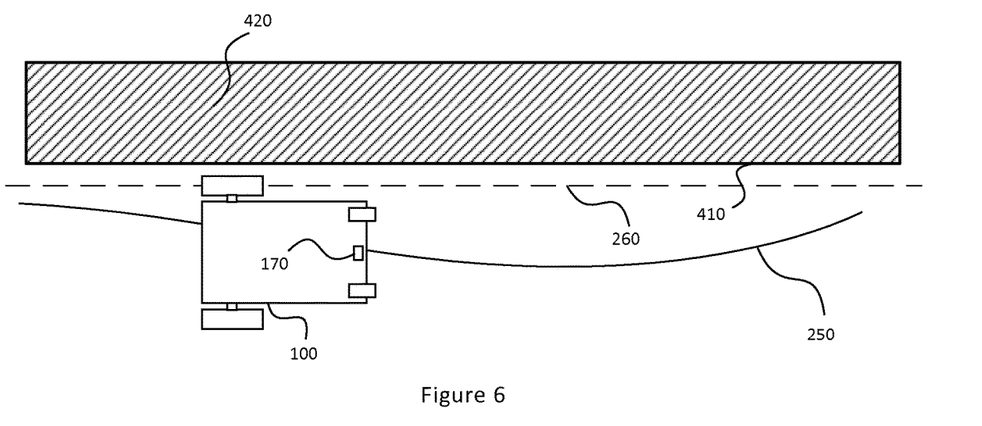
FIG. 6 shows a robotic work tool in operation next to an obstacle.

As can be seen in FIG. 6, the preliminary working area perimeter 250 has been established as a wavy line, probably as the robotic work tool 100 has been trying to avoid the obstacle 420, e.g. a flower bed, when defining the perimeter around the working area 205. Based on the collected sensed input data, the at least one controller 210 may then detect the edges 410 of the obstacle 420, i.e. the edges 410 that borders the working area 205. It may be assumed that it is desired that the robotic work tool 100 should operate within a working area 205 that may be parallel with the edge 410. Accordingly, the adjusted working area perimeter 260 may be aligned with, and/or positioned as close as possible to, the one or more edges 410. By applying the perimeter adjustment function to the established working area perimeter 250 such an adjusted working area perimeter 260 is produced.

In accordance with the above described embodiment, the robotic work tool system 200 may further be configured to adapt the cutting width based on the detected one or more edges 410. Accordingly, it may be ensured that the working area 205 may cover the intended working area 205 completely. For example, with a working area 205 along a pathway, it may be ensured that the adjusted working area perimeter 260 is aligned with the pathway and the robotic work tool may operate all the way up to the pathway.

According to one example, the collected sensed input data may comprise imaging data, which may be collected by the robotic work tool 100 while being driven to establish a preliminary working area perimeter. The robotic work tool system 200 may then be configured to detect the terrain feature edges by processing the imaging data, i.e. the robotic work tool system 200 may "see" the actual borders of the working area 205 by analyzing the imaging data. Based on these terrain features of the imaging data gathered by the robotic work tool 100, the robotic work tool system 200 may adjust the preliminary working area perimeter 250 around the working area 205 and thereby produce the adjusted working area perimeter 260. In this embodiment, the at least one sensor 170 may comprise an imaging device, such as a camera.

In one embodiment, the collected sensed input data comprises load exerted on the robotic work tool's cutting blade 160. The one or more edges 410 in the working area 205 may be detected when the exerted load is below a load threshold value associated with a load exerted on a robotic work tool's cutting blade 160. This will be further described with reference to FIG. 7. In the upper part of FIG. 7, it is illustrated how the robotic work tool 100 is driven around the working area 205 in order to establish the preliminary working area perimeter 250. In the lower part of FIG. 7, the load exerted on the robotic work tool's cutting blade 160 associated with the preliminary working area perimeter 250 is illustrated. As can be seen, the load in this exemplary embodiment decreases when the robotic work tool 100 is driven in the obstacle 420, e.g. a pathway. Accordingly, when the load is below a certain threshold, this may indicate that the robotic work tool 100 is driven in an area that is not supposed to be included in the working area 205 in which the robotic work tool 100 is intended to operate. Hence, the robotic work tool system 200 may adjust the established preliminary working area perimeter 250 to be aligned along the obstacle 420 and may thereby produce an adjusted working area perimeter 260.

Figure 7:
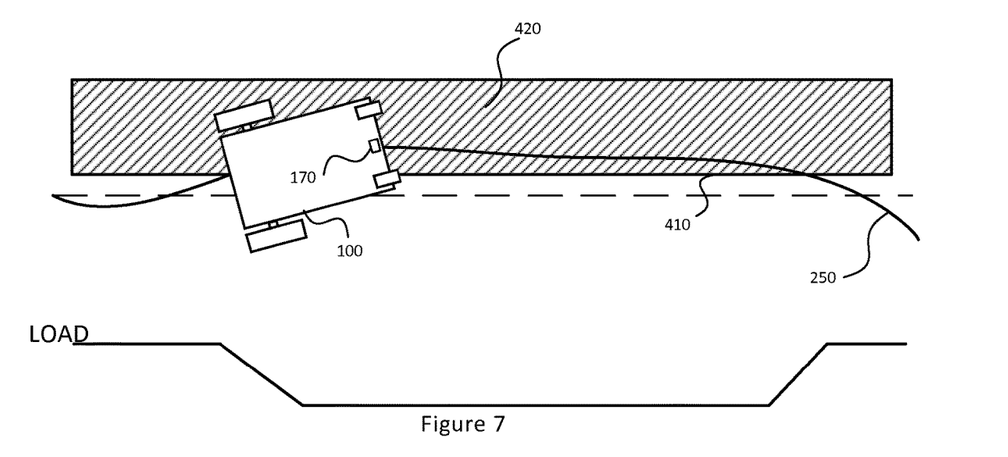
FIG. 7 shows a load of a robotic work tool's cutting blade associated with the operation of the robotic work tool.

In the above described embodiment, load exerted on the rotating blade 160 may be determined by for example measuring the power delivered to the cutter motor 165 or by measuring the axle torque exerted by the rotating blade 160.

In one embodiment, the collected sensed input data may comprise load exerted on the robotic work tool's wheels 130. The one or more edges 410 in the working area 205 may be detected when the exerted load on at least one of the wheels 130 is above a wheel load threshold value associated with a load exerted on the robotic work tool's wheels 130. When the robotic work tool 100 is driven with at least one of the wheels 130 in an obstacle 420, e.g. a flowerbed, the load exerted on the at least one wheel 130 within the obstacle 420 may increase. Accordingly, when the load exerted on at least one of the wheels 130 is above a certain wheel load threshold, this may indicate that the robotic work tool 100 is driven in an area that is not supposed to be included in the working area 205 in which the robotic work tool 100 is intended to operate. Additionally, or alternatively, when the load exerted on the wheels 130 of the robotic work tool 100 differ significantly between each other, this may also indicate that the robotic work tool 100 is driven in an area that is not supposed to be included in the working area 205 in which the robotic work tool 100 is intended to operate. Hence, the robotic work tool system 200 may adjust the established preliminary working area perimeter 250 to be aligned along the obstacle 420 and may thereby produce an adjusted working area perimeter 260.

In the above described embodiment, load exerted on the wheels 130 may be determined by for example measuring the power delivered to the electric motor 150 or by measuring the axle torque exerted by the wheels 130.

In one embodiment, which will be described with reference to FIG. 2C, the robotic work tool 100 may be driven a portion of a lap around the working area 205 to preliminarily define a perimeter around the working area 205. The robotic work tool system 200 may then be configured to establish the preliminary working area perimeter 250 by interpolating the "missing" portion of the lap around the working area 205. This portions is marked as a dashed line between points B and A in FIG. 2C. Accordingly, a "connected" preliminary working area perimeter 250, i.e. an enclosed area, may be established regardless of whether the robotic work tool 100 is driven a complete lap around the working area 205 or not. This may also prevent problems that may arise if the robotic work tool 100 does not finish the lap around the working area exactly in the same place at the robotic work tool 100 started the lap.

In one advantageous embodiment, the robotic work tool 100 may be a robotic lawn mower.

According to a second aspect, there is provided a method implemented in the robotic work tool system according to the first aspect. The method will be described with reference to FIG. 8.

Figure 8:
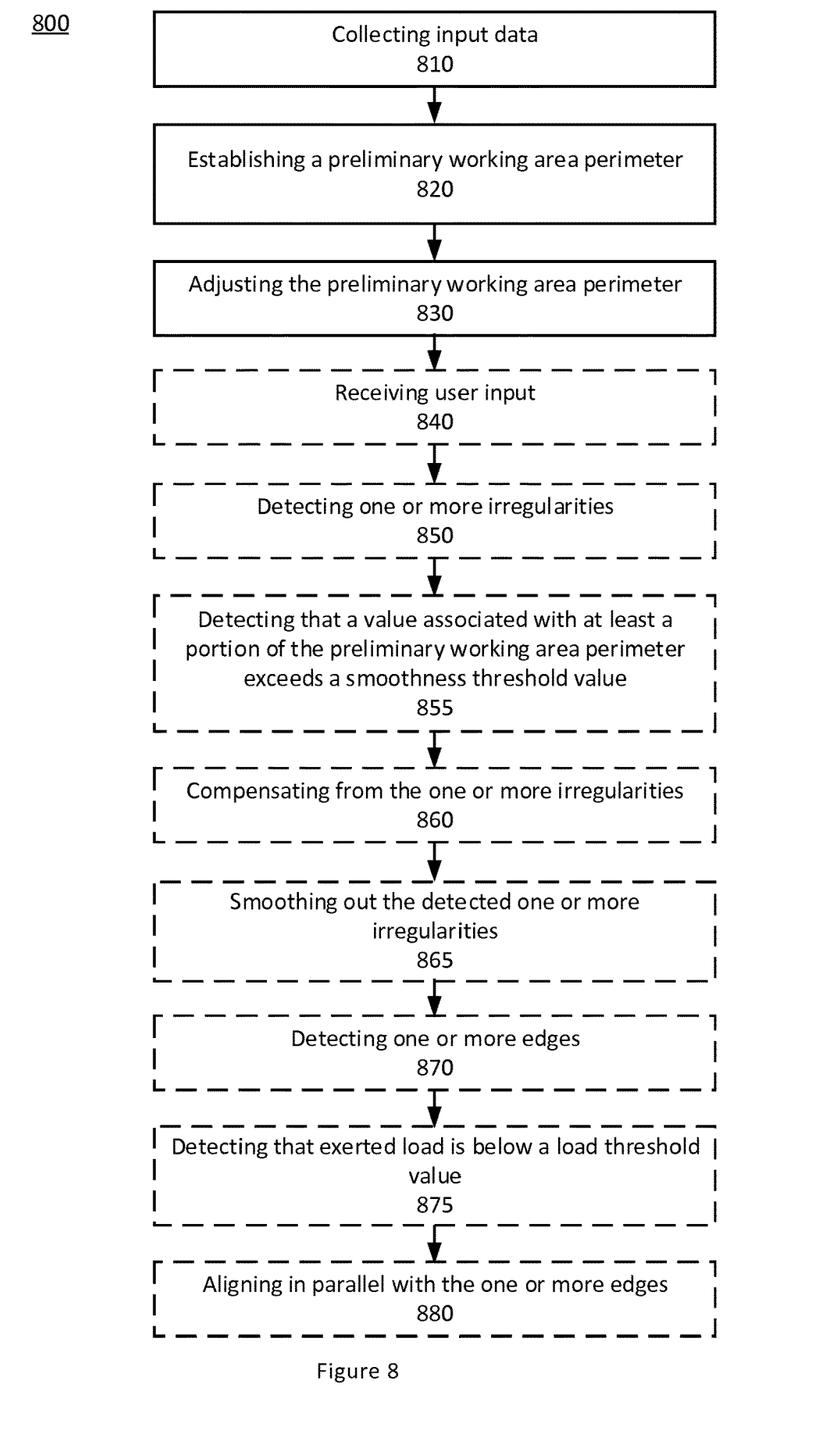
FIG. 8 shows a flowchart of an example method performed by a robotic work tool.

In one embodiment, the method 800 may be performed by a robotic work tool system 200 for defining a perimeter for a working area 205 in which a robotic work tool 100 is subsequently intended to operate. The robotic work tool system 200 may comprise at least one controller 210, at least one memory 220 storing a perimeter adjustment function, and the robotic work tool 100. The robotic work tool 100 may comprise at least one sensor unit 170. The method may comprise collecting 810 sensed input data, by means of the at least one sensor unit 170, while the robotic work tool 100 is driven at least a portion of a lap around the working area 205. The robotic work tool 100 may be driven said at least a portion of a lap to preliminarily define a perimeter around the working area 205. The method 800 may further comprise establishing 820, by means of the at least one controller 210, a preliminary working area perimeter 250; and adjusting 830, by means of the at least one controller 210, the preliminary working area perimeter 250 by applying the perimeter adjustment function to the established preliminary working area perimeter 250. Thereby an adjusted working area perimeter 260 may be produced.

In one embodiment, the perimeter adjustment function is based on the collected sensed input data.

In one further embodiment, the collected sensed input data may include sensed input data that represents a shape of the preliminary working area perimeter 250.

In one embodiment, the robotic work tool system 200 may further comprise an apparatus having a user interface 600. In this embodiment, the method may further comprise receiving 840 user input, by means of the user interface 600. The user input may be received from a user during the user's operation and interaction with the user interface. The received user input may be associated with the collected sensed input data and the perimeter adjustment function may further be based on the user input associated with the collected sensed input data.

In one embodiment, the method may further comprise detecting 850, by means of the at least one controller 210, based on the shape of the preliminary working area perimeter 250, whether there exist one or more irregularities in the preliminary working area perimeter 250. In response to that one or more irregularities are detected in the preliminary working area perimeter 250, the method may compensate 860, by means of the at least one controller 210, the preliminary working area perimeter 250 from the detected one or more irregularities by applying the perimeter adjustment function to the established preliminary working area perimeter 250. Thereby the adjusted working area perimeter 260 is produced.

In one embodiment, the method may further comprise detecting one or more irregularities in the preliminary working area perimeter by detecting 855 when a value associated with at least a portion of the preliminary working area perimeter 250 exceeds a smoothness threshold value representing a smooth working area perimeter. The method may further comprise compensating 860 the preliminary working area perimeter 250 from the detected one or more irregularities by smoothing out 865 the detected one or more irregularities in the preliminary working area perimeter 250.

In one embodiment, the method 800 may further comprise detecting 870, by means of the at least one controller 210, one or more edges 410 in the working area 205. The one or more edges 410 may correspond to terrain feature edges. The method may further comprise aligning 880, by means of the at least one controller 210, the preliminary working area perimeter 250 in parallel with the one or more edges 410 by applying the perimeter adjustment function to the established preliminary working area perimeter 250 and thereby producing the adjusted working area perimeter 260.

In one embodiment, the collected sensed input data may comprise load exerted on the robotic work tool's cutting blade 160. The method 800 may then further comprise detecting the one or more edges 410 in the working area 205 by detecting 875 when the exerted load is below a load threshold value associated with a load exerted on a robotic work tool's cutting blade.

Figure 9:
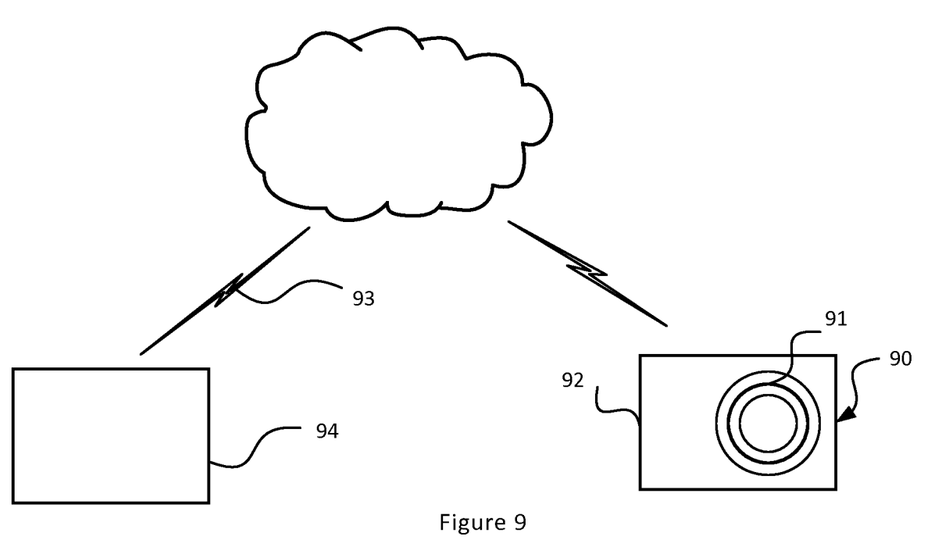
FIG. 9 shows a schematic view of a computer-readable medium according to the teachings herein.

FIG. 9 shows a schematic view of a computer-readable medium as described in the above. The computer-readable medium 90 is in this embodiment a data disc 90. In one embodiment the data disc 90 is a magnetic data storage disc. The data disc 90 is configured to carry instructions 91 that when loaded into a controller, such as a processor, execute a method or procedure according to the embodiments disclosed above. The data disc 90 is arranged to be connected to or within and read by a reading device 92, for loading the instructions into the controller. One such example of a reading device 92 in combination with one (or several) data disc(s) 90 is a hard drive. It should be noted that the computer-readable medium can also be other mediums such as compact discs, digital video discs, flash memories or other memory technologies commonly used. In such an embodiment the data disc 90 is one type of a tangible computer-readable medium 90.

The instructions 91 may also be downloaded to a computer data reading device 94, such as the controller 210 or other device capable of reading computer coded data on a computer-readable medium, by comprising the instructions 91 in a computer-readable signal 93 which is transmitted via a wireless (or wired) interface (for example via the Internet) to the computer data reading device 94 for loading the instructions 91 into a controller. In such an embodiment the computer-readable signal 93 is one type of a non-tangible computer-readable medium 90.

The instructions may be stored in a memory (not shown explicitly in FIG. 9, but referenced 220 in FIG. 2B) of the computer data reading device 94.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc. Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A robotic work tool system for defining a working area in which a robotic work tool is subsequently intended to operate, the robotic work tool system comprising:
   a robotic work tool comprising at least one sensor unit configured to collect sensed input data, wherein the at least one sensor unit is configured to collect the sensed input data while the robotic work tool is driven at least a portion of a lap around the working area to preliminarily define a perimeter around the working area;
   at least one controller configured to establish a preliminary working area perimeter; and
   at least one memory configured to store a perimeter adjustment function and further including instructions that, when executed by the at least one controller, cause the at least one controller to adjust the perimeter of the working area by applying the perimeter adjustment function to the preliminary working area perimeter and thereby produce an adjusted working area perimeter, wherein the perimeter adjustment function is based on the collected sensed input data and wherein the sensed input data corresponds to terrain features;

wherein adjusting the perimeter of the working area comprises:

detecting one or more edges in the working area, wherein the one or more edges correspond to terrain feature edges; and applying the perimeter adjustment function to the preliminary working area perimeter to align the adjusted working area perimeter to be substantially parallel with and spaced apart from the one or more edges.

2. The robotic work tool system according to claim 1, wherein the sensed input data includes at least one sensed input data that represents a shape of the preliminary working area perimeter.

3. The robotic work tool system according to claim 1, further comprising an apparatus having a user interface configured to receive user input from a user during the user's operation and interaction with said user interface, wherein the user input received is associated with the sensed input data and wherein the perimeter adjustment function is further based on said user input associated with the sensed input data.

4. The robotic work tool system according to claim 2, wherein the at least one memory includes instructions that, when executed by the at least one controller, cause the at least one controller to:

detect, based on the shape of the preliminary working area perimeter, whether one or more irregularities exist in the preliminary working area perimeter; and in response to detecting one or more irregularities in the preliminary working area perimeter, compensate the preliminary working area perimeter from the detected one or more irregularities by applying the perimeter adjustment function to the preliminary working area perimeter and thereby produce the adjusted working area perimeter.

5. The robotic work tool system according to claim 3, wherein the at least one or more irregularities are detected when a value associated with at least a portion of the preliminary working area perimeter exceeds a smoothness threshold value representing a smooth working area perimeter, and wherein the preliminary working area perimeter is compensated from the at least-one or more irregularities by smoothing out the one or more irregularities detected in the preliminary working area perimeter.

6. The robotic work tool system according to claim 1, wherein the sensed input data comprises imaging data and wherein the one or more edges are detected based on the imaging data.

7. The robotic work tool system according to claim 1, wherein the sensed input data comprises load exerted on the robotic work tool's cutting blade and wherein the one or more edges in the working area are detected when the exerted load is below a load threshold value associated with a load exerted on a robotic work tool's cutting blade.

8. The robotic work tool system according to claim 1, wherein the robotic work tool is a robotic lawn mower.

9. A method performed by a robotic work tool system for defining a perimeter for a working area in which a robotic work tool is subsequently intended to operate, wherein the robotic work tool system comprises at least one controller, at least one memory storing a perimeter adjustment function, and the robotic work tool, and wherein the robotic work tool comprises at least one sensor unit, the method comprising:

collecting sensed input data, by means of the at least one sensor unit, while the robotic work tool is driven at least a portion of a lap around the working area to preliminarily define a perimeter around the working area;

establishing, by means of the at least one controller, a preliminary working area perimeter; and adjusting, by means of the at least one controller, the preliminary working area perimeter by applying the perimeter adjustment function to the preliminary working area perimeter and thereby producing an adjusted working area perimeter, wherein the perimeter adjustment function is based on the sensed input data and wherein the sensed input data corresponds to terrain features;

detecting, by means of the at least one controller, one or more edges in the working area, wherein the one or more edges correspond to terrain feature edges; and applying, by means of the at least one controller, the perimeter adjustment function to the preliminary working area perimeter to align the adjusted working area perimeter to be substantially parallel with and spaced apart from the one or more edges.

10. The method according to claim 9, wherein the sensed input data includes at least one sensed input data that represents a shape of the preliminary working area perimeter.

11. The method according to claim 10, wherein the method further comprises:

detecting, by means of the at least one controller, based on the shape of the preliminary working area perimeter, whether one or more irregularities in the preliminary working area perimeter exist; and in response to detecting one or more irregularities in the preliminary working area perimeter compensating, by means of the at least one controller, the preliminary working area perimeter from the detected one or more irregularities by applying the perimeter adjustment function to the preliminary working area perimeter and thereby producing the adjusted working area perimeter.

12. The method according to claim 11, wherein detecting the one or more irregularities in the preliminary working area perimeter comprises:

detecting when a value associated with at least a portion of the preliminary working area perimeter exceeds a smoothness threshold value representing a smooth working area perimeter, and wherein compensating the preliminary working area perimeter from the one or more irregularities comprises:

smoothing out the one or more irregularities in the preliminary working area perimeter.

13. The method according to claim 9, wherein the robotic work tool system further comprises an apparatus having a user interface, and wherein the method further comprises:

receiving user input, by means of the user interface, from a user during the user's operation and interaction with said user interface, wherein the user input received is associated with the sensed input data and wherein the perimeter adjustment function is further based on said user input associated with the sensed input data.

14. The method according claim 9, wherein the sensed input data comprises imaging data and wherein detecting the one or more edges in the working area comprises:

analyzing the imaging data.

15. The method according claim 9, wherein the sensed input data comprises load exerted on the robotic work tool's cutting blade and wherein detecting the one or more edges in the working area comprises:

detecting when the exerted load is below a load threshold value associated with a load exerted on a robotic work tool's cutting blade.

\* \* \* \* \*

UNITED STATES PATENT AND TRADEMARK OFFICE
CERTIFICATE OF CORRECTION

PATENT NO. : 12,153,435 B2
APPLICATION NO. : 17/057381
DATED : November 26, 2024
INVENTOR(S) : Stefan Grufman et al.

It is certified that error appears in the above-identified patent and that said Letters Patent is hereby corrected as shown below:

In the Claims

In Column 15, Claim 5, Line 48, "at least-one or more" should read -- at least one or more --

In Column 16, Claim 9, Line 9, "perimeter; and adjusting" should read -- perimeter; adjusting, --

In Column 16, Claim 14, Line 64, "according claim" should read -- according to claim --

In Column 17, Claim 15, Line 1, "according claim" should read -- according to claim --

Signed and Sealed this
Fifteenth Day of April, 2025

Coke Morgan Stewart
*Acting Director of the United States Patent and Trademark Office*